US012586098B2

(12) United States Patent
Tucker et al.

(10) Patent No.: US 12,586,098 B2
(45) Date of Patent: *Mar. 24, 2026

(54) ENHANCED AUTOMATIC SAVINGS PROGRAM

(71) Applicant: Bank of America Corporation, Charlotte, NC (US)

(72) Inventors: Faith A. Tucker, Wichita, KS (US); Portia Sherman Mackinnon, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/947,490

(22) Filed: Nov. 14, 2024

(65) Prior Publication Data

US 2025/0069108 A1     Feb. 27, 2025

Related U.S. Application Data

(63) Continuation of application No. 17/728,194, filed on Apr. 25, 2022, now Pat. No. 12,175,489, which is a continuation of application No. 16/571,510, filed on Sep. 16, 2019, now Pat. No. 11,348,133, which is a continuation of application No. 14/551,930, filed on Nov. 24, 2014, now abandoned, which is a
(Continued)

(51) Int. Cl.
| | |
|---|---|
| *G06Q 30/02* | (2023.01) |
| *G06Q 30/0207* | (2023.01) |
| *G06Q 40/06* | (2012.01) |

(52) U.S. Cl.
CPC ......... *G06Q 30/0215* (2013.01); *G06Q 40/06* (2013.01)

(58) Field of Classification Search
CPC .............. G06Q 30/0215; G06Q 40/06; G06Q 30/0207–30/0277
See application file for complete search history.

(56) References Cited

U.S. PATENT DOCUMENTS

| | | |
|---|---|---|
| 4,750,119 A | 6/1988 | Cohen et al. |
| 4,823,264 A | 4/1989 | Deming |

(Continued)

FOREIGN PATENT DOCUMENTS

| | | |
|---|---|---|
| JP | 200350916 | 2/2003 |
| WO | 9314476 A1 | 7/1993 |

(Continued)

OTHER PUBLICATIONS

Aug. 2, 2005—(US)—Related U.S. Appl. No. 11/161,418.
(Continued)

*Primary Examiner* — Thuy N Nguyen
(74) *Attorney, Agent, or Firm* — Banner & Witcoff, Ltd.

(57)     ABSTRACT

A computer implemented system and method are disclosed of processing a financial transaction that includes determining an automatic savings amount and rewards amount payments. The system may comprises a checking account, a savings account, an account of a merchant, and one or more computer systems including a communication interface, processor, and memory storing computer-executable instructions. The rewards amount may be calculated based on various techniques.

14 Claims, 3 Drawing Sheets

Related U.S. Application Data continuation of application No. 12/368,034, filed on Feb. 9, 2009, now abandoned.

(60) Provisional application No. 61/027,397, filed on Feb. 8, 2008.

(56)                    References Cited

U.S. PATENT DOCUMENTS

| | | | |
|---|---|---|---|
| 4,941,090 A | | 7/1990 | McCarthy |
| 5,056,019 A | | 10/1991 | Schultz et al. |
| 5,200,889 A | | 4/1993 | Mori |
| 5,287,268 A | | 2/1994 | McCarthy |
| 5,302,811 A | | 4/1994 | Fukatsu |
| 5,466,919 A | | 11/1995 | Hovakimian |
| 5,471,669 A | | 11/1995 | Lidman |
| 5,621,640 A | | 4/1997 | Burke |
| 5,787,404 A | | 7/1998 | Fernandez-Holmann |
| 5,970,480 A | | 10/1999 | Kalina |
| 5,987,429 A | | 11/1999 | Maritzen et al. |
| 6,036,344 A | | 3/2000 | Goldenberg |
| 6,049,778 A | * | 4/2000 | Walker ............... G06Q 30/0212 |
| | | | 705/14.39 |
| 6,088,682 A | | 7/2000 | Burke |
| 6,112,191 A | * | 8/2000 | Burke ................... G06Q 20/18 |
| | | | 705/17 |
| 6,119,099 A | | 9/2000 | Walker et al. |
| 6,164,533 A | | 12/2000 | Barton |
| 6,267,670 B1 | | 7/2001 | Walker et al. |
| 6,298,329 B1 | | 10/2001 | Walker et al. |
| 6,381,590 B1 | | 4/2002 | Debois |
| 6,581,041 B1 | | 6/2003 | Canney |
| 6,598,024 B1 | | 7/2003 | Walker et al. |
| 6,631,358 B1 | | 10/2003 | Ogilvie |
| 6,965,868 B1 | * | 11/2005 | Bednarek ........... G06Q 30/0207 |
| | | | 705/7.29 |
| 7,072,851 B1 | * | 7/2006 | Wilcox .................. G06Q 40/00 |
| | | | 705/14.34 |
| 7,090,138 B2 | | 8/2006 | Rettenmyer ....... G06Q 30/0238 |
| | | | 235/492 |
| 7,392,224 B1 | * | 6/2008 | Bauer .................... G06Q 20/04 |
| | | | 705/41 |
| 7,398,226 B2 | * | 7/2008 | Haines ................... G06Q 30/02 |
| | | | 705/14.1 |
| 7,597,255 B2 | * | 10/2009 | Deane .................... G06K 19/08 |
| | | | 235/383 |
| 7,725,387 B1 | * | 5/2010 | Fitch ...................... G06Q 40/02 |
| | | | 705/38 |
| 7,753,261 B2 | | 7/2010 | Rosenblatt et al. |
| 7,797,208 B2 | * | 9/2010 | Thomas ............... G06Q 20/102 |
| | | | 705/35 |
| 8,301,530 B2 | | 10/2012 | Carretta et al. |
| 8,401,936 B2 | | 3/2013 | Penning et al. |
| 8,407,137 B2 | * | 3/2013 | Thomas ................. G06Q 20/10 |
| | | | 705/38 |
| 8,416,924 B1 | * | 4/2013 | Barth .................... G06Q 40/02 |
| | | | 705/14.1 |
| 8,473,380 B2 | * | 6/2013 | Thomas ................. G06Q 20/10 |
| | | | 705/40 |
| 8,635,137 B2 | | 1/2014 | Carretta et al. |
| 8,738,429 B2 | * | 5/2014 | Shepard ............. G06Q 30/0224 |
| | | | 705/14.1 |
| 9,495,703 B1 | | 11/2016 | Kaye, III |
| 9,734,536 B2 | | 8/2017 | Cruttenden et al. |
| 2002/0046124 A1 | | 4/2002 | Alderucci et al. |
| 2002/0120513 A1 | * | 8/2002 | Webb .................... G06Q 20/20 |
| | | | 705/36 R |
| 2002/0161630 A1 | | 10/2002 | Kern et al. |
| 2002/0188533 A1 | * | 12/2002 | Sanchez ................. G06Q 40/02 |
| | | | 705/30 |
| 2003/0009379 A1 | | 1/2003 | Narasimhan et al. |
| 2003/0033211 A1 | * | 2/2003 | Haines ................. B01J 23/6562 |
| | | | 705/14.1 |

| | | | |
|---|---|---|---|
| 2003/0061097 A1 | * | 3/2003 | Walker ................... G06Q 30/04 |
| | | | 705/16 |
| 2003/0064788 A1 | | 4/2003 | Walker et al. |
| 2003/0101131 A1 | | 5/2003 | Warren et al. |
| 2003/0149629 A1 | | 8/2003 | Claridge et al. |
| 2003/0200163 A1 | | 10/2003 | O'Riordan et al. |
| 2003/0208439 A1 | | 11/2003 | Rast |
| 2003/0233317 A1 | | 12/2003 | Judd |
| 2003/0236712 A1 | * | 12/2003 | Antonucci ............. G06Q 30/02 |
| | | | 705/14.3 |
| 2004/0039645 A1 | | 2/2004 | Walker et al. |
| 2004/0054593 A1 | | 3/2004 | Van Luchen |
| 2004/0122736 A1 | * | 6/2004 | Strock ............... G06Q 30/0207 |
| | | | 705/14.31 |
| 2004/0153400 A1 | | 8/2004 | Burke |
| 2004/0193497 A1 | | 9/2004 | Tanaka |
| 2004/0200898 A1 | * | 10/2004 | Kepecs ................. G06Q 20/342 |
| | | | 235/380 |
| 2004/0222285 A1 | | 11/2004 | Pohl |
| 2005/0004867 A1 | | 1/2005 | Spector |
| 2005/0021353 A1 | | 1/2005 | Aviles et al. |
| 2005/0021363 A1 | | 1/2005 | Stimson et al. |
| 2005/0096981 A1 | * | 5/2005 | Shimada ............ G06Q 30/0238 |
| | | | 705/14.36 |
| 2005/0097034 A1 | | 5/2005 | Loeger et al. |
| 2005/0133590 A1 | * | 6/2005 | Rettenmyer ............ G07F 7/025 |
| | | | 235/493 |
| 2005/0222951 A1 | * | 10/2005 | Sherman ................ G06Q 40/02 |
| | | | 705/40 |
| 2005/0251440 A1 | * | 11/2005 | Bednarek ........... G06Q 30/0203 |
| | | | 705/7.32 |
| 2006/0047589 A1 | * | 3/2006 | Grau ..................... G06Q 40/00 |
| | | | 705/35 |
| 2006/0206385 A1 | * | 9/2006 | Walker ................. G06Q 20/387 |
| | | | 705/21 |
| 2006/0212357 A1 | * | 9/2006 | White .................... G06Q 30/02 |
| | | | 705/16 |
| 2007/0033134 A1 | * | 2/2007 | Carretta ................. G06Q 20/40 |
| | | | 705/38 |
| 2007/0071197 A1 | * | 3/2007 | Ryoo .................... G06Q 20/355 |
| | | | 379/114.15 |
| 2007/0080213 A1 | * | 4/2007 | Workman .............. G06Q 20/29 |
| | | | 705/16 |
| 2007/0094130 A1 | | 4/2007 | Burke |
| 2007/0112631 A1 | * | 5/2007 | Voltmer ............. G06Q 30/0267 |
| | | | 705/14.26 |
| 2007/0124203 A1 | * | 5/2007 | Popescu ................. G06Q 30/02 |
| | | | 705/14.71 |
| 2007/0174166 A1 | * | 7/2007 | Jones ..................... G06Q 30/02 |
| | | | 705/35 |
| 2007/0198354 A1 | * | 8/2007 | Senghore ............... G06Q 30/02 |
| | | | 705/14.27 |
| 2007/0294166 A1 | * | 12/2007 | Cello ................... G06Q 20/102 |
| | | | 705/40 |
| 2008/0089111 A1 | * | 4/2008 | Lee ..................... G11C 13/0007 |
| | | | 257/E45.001 |
| 2008/0103968 A1 | * | 5/2008 | Bies ....................... G06Q 20/06 |
| | | | 705/39 |
| 2009/0063332 A1 | | 3/2009 | Tabaczynski et al. |
| 2009/0222358 A1 | * | 9/2009 | Bednarek ........... G06Q 30/0601 |
| | | | 705/26.1 |
| 2009/0313128 A1 | * | 12/2009 | Webb .................... G06Q 20/20 |
| | | | 705/16 |
| 2010/0076776 A1 | | 3/2010 | Kopko et al. |
| 2010/0153200 A1 | * | 6/2010 | Thomas ................. G06Q 20/40 |
| | | | 705/40 |
| 2011/0004546 A1 | * | 1/2011 | Thomas ................. G06Q 20/10 |
| | | | 705/39 |
| 2012/0072345 A1 | | 3/2012 | Solomon et al. |
| 2012/0197794 A1 | | 8/2012 | Grigg et al. |
| 2013/0030992 A1 | | 1/2013 | Carretta et al. |
| 2013/0231994 A1 | * | 9/2013 | Antonucci ......... G06Q 30/0229 |
| | | | 705/14.28 |
| 2014/0006275 A1 | | 1/2014 | Hanson et al. |
| 2014/0012691 A1 | | 1/2014 | Hanson et al. |
| 2014/0222636 A1 | | 8/2014 | Cheng et al. |
| 2014/0337150 A1 | | 11/2014 | Anand |

(56) References Cited

U.S. PATENT DOCUMENTS

| | | | |
|---|---|---|---|
| 2015/0081458 A1 | 3/2015 | Cruttenden et al. |
| 2015/0193866 A1 | 7/2015 | Van Heerden et al. |
| 2015/0193867 A1 | 7/2015 | Del Vecchio et al. |
| 2015/0230045 A1 | 8/2015 | Johnson et al. |
| 2016/0042340 A1 | 2/2016 | Burke et al. |
| 2016/0321663 A1 | 11/2016 | Batlle |

FOREIGN PATENT DOCUMENTS

| | | |
|---|---|---|
| WO | 03030054 A1 | 4/2003 |
| WO | 2007016697 A2 | 2/2007 |
| WO | 2008111965 A2 | 9/2008 |

OTHER PUBLICATIONS

Aug. 17, 2007 (WO) International Search Report, PCT/US 06/30362, 6 pages.
Feb. 6, 2007—(PCT)—Related Application No. PCT/US07/61694.
Feb. 8, 2008—(US)-.Related U.S. Appl. No. 61/027,397.
Jan. 2008—Option1 Credit Union, Options News About Opportunity, 5 pages.
Feb. 9, 2009—(US)—Related U.S. Appl. No. 12/368,034.
Sep. 4, 2009—(US)—Related U.S. Appl. No. 12/554,616.
Jul. 30, 2010—Supplementary European Search Report, PCT/US2006030362, 5 pages.
Mar. 24, 2010—(US)—Related U.S. Appl. No. 12/730,394.
Aug. 8, 2011 (CN) Second Office Action, Application No. 200780050996.5, 6 pages.
Dec. 13, 2011 (EP)—Office Action—Application No. Patent No. 0689359.4-221/1915731, 18 pages.
Jul. 14, 2011 (EP) Communication from European Patent Office, Application No. 06 789 359.4 0 2221, 5 pages.
Jun. 14, 2011—(PCT) Response to Office Action—Application PCT/US2006/030362, 11 pages.
Nov. 24, 2011—(PCT) Response to Office Action—PCT Application PCT/US2006/030362, 4 pages.
Apr. 27, 2012—(US) File History—Patent Application, U.S. Appl. No. 11/161,418, filed Aug. 2, 2005.
Nov. 27, 2012—(US) Non-Final Office Action—U.S. Appl. No. 13/613,433.
Sep. 7, 2012—(US) File History for U.S. Appl. No. 12/554,616, filed Sep. 4, 2009.
Sep. 24, 2012 (US)—Notice of Allowance and Fee(s) Due, U.S. Appl. No. 12/554,935, 10 pages.
Sep. 7, 2012—(US) File History for U.S. Appl. No. 12/368,034, filed Feb. 9, 2009.
Aug. 28, 2013—(US) Advisory Action—U.S. Appl. No. 12/730,394.
Dec. 17, 2013—(US)—Related U.S. Appl. No. 14/109,269.
Apr. 5, 2017—(US) Office Action—U.S. Appl. No. 14/109,269.
Dec. 20, 2017—(US) Office Action—U.S. Appl. No. 14/844,884.
Mar. 27, 2017—(US) Office Action—U.S. Appl. No. 14/551,930.
Nov. 27, 2017—(US) Office Action—U.S. Appl. No. 14/850,593.
Apr. 23, 2018—(US) Office Action—U.S. Appl. No. 14/844,880.
Jan. 8, 2018—(US) Office Action—U.S. Appl. No. 14/844,880.
Jan. 10, 2018—(US) Office Action—U.S. Appl. No. 14/844,896.
Jan. 18, 2018—(US) Office Action—U.S. Appl. No. 14/844,875.
Jan. 18, 2018—(US) Office Action—U.S. Appl. No. 14/844,887.
Jul. 27, 2018—(US) Office Action—U.S. Appl. No. 14/844,896.
May 21, 2018—(US) Office Action—U.S. Appl. No. 14/850,593.
Sep. 7, 2018—(US) Office Action—U.S. Appl. No. 14/551,930.
Dec. 2, 2019—(US) Patent Board Decision—Examiner Reversed U.S. Appl. No. 14/109,269.
May 14, 2019—(US) Office Action—U.S. Appl. No. 14/551,930.
Dec. 15, 2021—(US) Office Action—U.S. Appl. No. 16/817,785.
Oct. 14, 2022—(US) Non-Final Office Action—U.S. Appl. No. 17/728,194.
Apr. 13, 2023—(US) Final Office Action—U.S. Appl. No. 17/728,194.
Aug. 14, 2023—(US) Non-Final Office Action—U.S. Appl. No. 17/728,194.

Apr. 25, 2024—(US) Non-Final Office Action—U.S. Appl. No. 17/728,194.
Aug. 14, 2024—(US) Notice of Allowance—U.S. Appl. No. 17/728,194.
Aug. 29, 2024—(US) Notice of Allowance—U.S. Appl. No. 17/728,194.
Jan. 11, 2024—(US) Final Office Action—U.S. Appl. No. 17/428,194.
Jul. 31, 2024—(US) Non-Final Office Action—U.S. Appl. No. 18/373,720.
Jul. 31, 2024—Non-Final Office Action—U.S. Appl. No. 18/373,720.
Oct. 8, 2024—(US) Non-Final Office Action—U.S. Appl. No. 18/373,720.
Banco Popular Ahorro Directo, <http://www.popular.com/ahorrodirectto/index-en.html>, downloaded Mar. 11, 2008, 3 pages.
Bank of America offers a new way to save, dated Oct. 4, 2005, www.msnbc.msn.com/id/9593071/#.UL463-SCmSo, 2 pages.
Bank of America's Twist on Debit Card Rewards, dated Oct. 6, 2005, www.depositaccounts.com/blog/2005/10/bank-of-americas-twist-on-debit-card-html, 1 page.
Bank of America's Unusual Automated Savings Plan by Jim Bruene, dated Oct. 5, 2005, © 1995-2010, Financial Insite, Inc., 2 pages.
Bank the Rest® savings program, Spend and Save. Together at last, <http://www.scotiabank.com/BankTheRest>, downloaded Jan. 25, 2012, 1 page.
Best Bets Financial Services, Premier Bank, <http://www.connectmidmissouri.com/directory/financial/premium.aspx>?id=1761644, downloaded Jan. 25, 2012, 4 pages.
Electronic Payments Primer, National Electronic Commerce Coordinating Counsel, Oct. 2002, http://www85.homepage.villanova.edu/timothy.ay/MIS3030/epayments_primer.pdf, 40 pages.
*Every Penny Counts, Inc.* v. *Bank of America Corporation and Bank of America, N.A.*, Memorandum and Order, U.S. District Court, Middle District of Florida, Fort Meyers Division, Case No. 2:07-cv-042, dated May 27, 2009, 6 pages.
*Every Penny Counts, Inc.* v. *Bank of America Corporation and Bank of America, N.A.*; Opinion and Order; U.S. District Court, Middle District of Florida, Fort Meyers Division, Case No. 2:07-cv-04-FtM-29SPC, dated Sep. 29, 2008, 16 pages.
File History for U.S. Appl. No. 12/730,394, filed Mar. 24, 2010.
Finance, <http://www.fatwallet.com/t/52/799201/>, 11 pages, downloaded Jan. 11, 2008.
Fowler, G.A., These Apps Can Finally Get you to Save Money, <http://www.wsj.com/articles/these-apps-can-finally-get-you-to-save-money-1434477296?mod=djemptech_t>, printed Oct. 6, 2015; 5 pages.
Google Scholar NPL (non-patent literature) Search Results, dated Dec. 11, 2021. (Year: 2021).
Introducing Free Checking with Extra Savings on top, Savings just got a whole lot easier, Capital One Bank, Baton Rouge Advocate, Oct. 28, 2009, 1 page.
North Carolina Bank and Trust, Round Up to Save, https:/www.ncbtonline.com/productsandservices/personal/ <http://www.ncbtonline.com/productsandservices/personal/> rounduptosave.aspx, downloaded Jan. 25, 2012, 2 pages.
Option1 Credit Union Spare Change Debit Card Savings Program, <http://www.option1cu.org/about-bell-com/news.html>, downloaded Feb. 3, 2008, 2 pages.
Round It up America®, Round up. Donate Change, Make a Difference, Support Round It up America® today!, http://www.rounditupamerica.org/donate-online.php <http://www.rounditupamerica.org/donate-online.php>, downloaded Jan. 25, 2012, 2 pages.
Round It up America®, Round up. Donate Change, Make a Difference. Recent News, <http://www/rounditupaemrica>.org, downloaded Jan. 25, 2012, 3 pages.
Round it up America®, Round up. Donate Change. Make a Difference, <http://www.rounditupamerica.org>, downloaded Nov. 8, 2010, 2 pages.
Text of First Office Action, PCT Application No. 20078005099965, Undated, 3 pages.
Wachovia Introduces New Product That Makes Saving Easy and Automatic for Consumers, http://www.wachovia.com/> inside/page/printer/0,,134_307% E1701.00.html, 3 pages, dated Jan. 11, 2008.
Wachovia offers customers Way2Save, <http://www.charlotte.com/businessA/-print/story/441323.html>, 1 page, downloaded Jan. 11, 2008.

(56)     References Cited

OTHER PUBLICATIONS

Wachovia offers new savings incentive that offers deposit match, <http://www.timesanddemocrat.com/>articles/2008/01/11 /business/ doc478, 2 pages, downloaded Jan. 11, 2008.

Wachovia Personal Finance FAQs, Way2Save Account, http://111 .wachovia.com/personal/page/printer/0J,657_2167% 5E12663, down-loaded Mar. 11, 2008, 3 pages.

Wachovia Way2Save(SM) Account Agreement, http://www.wachovia. com/misc/0, 1756,00.html, 2 <http://www.wachovia.com/misc/0% ef%bc%8c, 1756,00.html%ef%bc%8c2>, 3 pages, downloaded Jan. 18, 2008.

Wachovia, My Arch-Nemesis Bank, Offers Very Tempting 5% Plus Bonus Savings Account Deal, <http://www.punny>.org/money/ wachovia-my-arch-nemesis-bank-offers-v, 7 pages, downloaded Jan. 11, 2008.

Wachovia's Way2Save Savings Account, with scans, <http:// bankdesign.com/boardA12618.html>, 3 pages, downloaded Jan. 11, 2008.

Way2save, Turn Everyday Banking Into Automatic Savings bro-chure, © 2008, Wachovia Corporation, 6 pages.

Who Says You Can't Afford to Save? Bank on it: Spare Change Can Add up Fast (Third Edition), Jaffe, C.A., Mar. 5, 2000 © 2012 ProQuest LLC, 3 pages.

Wolfe, Daniel, "Wachovia Links Savings, Debit to Land Custom-ers," American Banker, vol. 173?issue 9, Jan. 14, 2008, 3 pages.

Jan. 16, 2025—(US) Office Action—U.S. Appl. No. 18/669,996.

* cited by examiner

ENHANCED AUTOMATIC SAVINGS PROGRAM

This application is a continuation of and claims priority to U.S. application Ser. No. 17/728,194, filed Apr. 25, 2022, and entitled, "Enhanced Automatic Savings Program," which is a continuation of and claims priority from U.S. Ser. No. 16/571,510, filed Sep. 16, 2019, which claims priority to abandoned U.S. Ser. No. 14/551,930, filed Nov. 24, 2014, which claims priority to abandoned U.S. Ser. No. 12/368, 034, filed Feb. 9, 2009, which claims priority to U.S. Provisional Application Ser. No. 61/027,397, filed Feb. 8, 2008; all of the above are herein incorporated by reference in their entireties.

RELATED APPLICATIONS

This application is related to U.S. application Ser. No. 11/161,418, filed Aug. 2, 2005, which is herein incorporated by reference in its entirety.

This application is related to PCT Application No. PCT/US07/61694, filed Feb. 6, 2007, which is herein incorporated by reference in its entirety.

This application is related to U.S. application Ser. No. 12/554,616, filed Sep. 4, 2009.

This application is related to U.S. application Ser. No. 12/730,394, filed Mar. 24, 2010.

TECHNICAL FIELD

Aspects of the disclosure generally relate to automated fund transfer and bonus payments associated with one or more accounts.

BACKGROUND

Many consumers feel that saving money is difficult. Those who make less than the median income level, or are raising families, or are new immigrants, find it particularly challenging to put money away for emergencies, a child's education, or a special purchase. Even affluent consumers who do have the means to save money often feel that they could save more.

A consumer can save funds in a bank account by making deposits into the account or by transferring funds from another account. In addition, grandparents or other relatives or friends sometimes desire to contribute money to somebody else's (e.g., a grandchild's) savings account.

Based on the foregoing, there is a need for a system and method for automatically facilitating and/or encouraging savings.

BRIEF SUMMARY

The following presents a simplified summary of the disclosure in order to provide a basic understanding of some aspects. It is not intended to identify key or critical elements of the invention or to delineate the scope of the invention. The following summary merely presents some concepts of the disclosure in a simplified form as a prelude to the more detailed description provided below.

A computer implemented system and method are disclosed of processing a financial transaction that includes determining an automatic savings amount and rewards amount payments. The system may comprises a checking account, a savings account, an account of a merchant, and one or more computer systems including a communication interface, processor, and memory storing computer-executable instructions. The rewards amount may be calculated based on various techniques.

Aspects of the disclosure generally relate to automated funds transfer and bonus payments associated with an account.

BRIEF DESCRIPTION OF THE DRAWINGS

The present disclosure is illustrated by way of example and not limited in the accompanying figures in which like reference numerals indicate similar elements and in which.

DETAILED DESCRIPTION

In accordance with various aspects of the disclosure, a method and system for enhanced automatic savings is disclosed. One embodiment, a computer implemented savings program in which each financial transaction by a customer of a bank or other financial institution automatically generates a savings amount which is deposited in the customer's or somebody else's savings account; thus the customer can accumulate savings conveniently and painlessly. In addition, automated loan payments, and automated contributions to charitable and charitable-like (e.g., environmental funds) organizations are contemplated by the disclosure.

Figure 1:
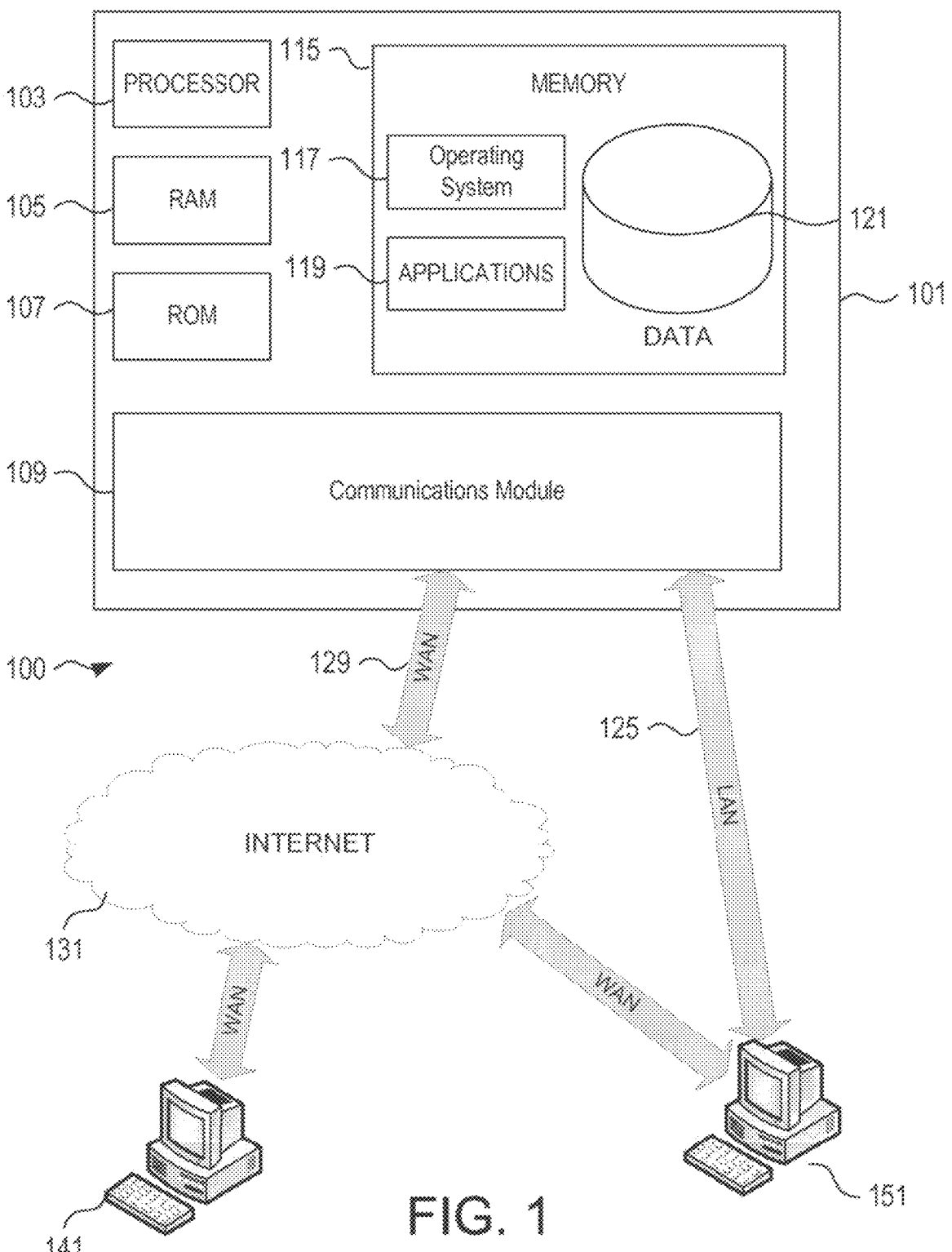
FIG. 1 shows an illustrative operating environment in which various aspects of the disclosure may be implemented.
Figure 2:
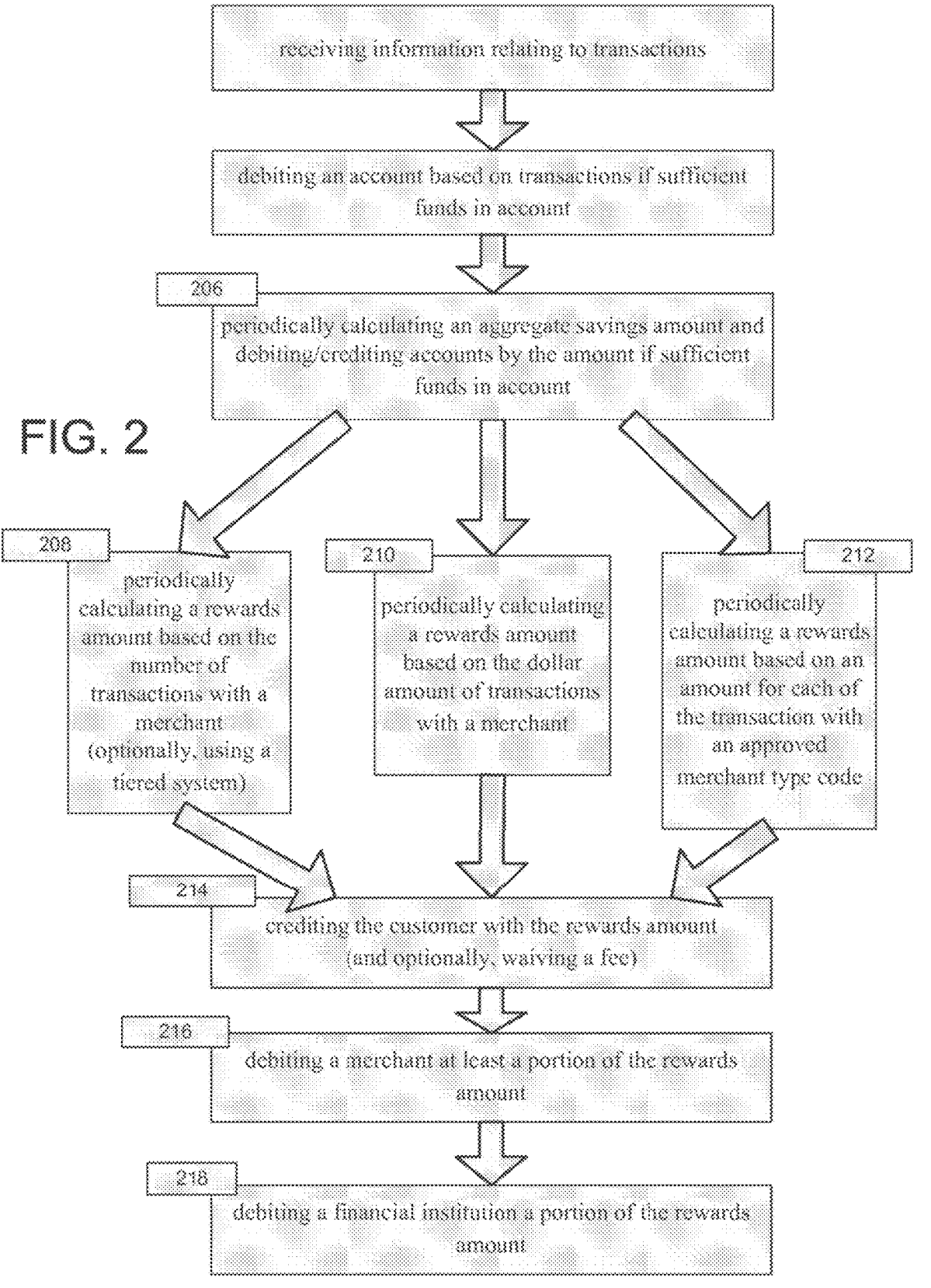
FIG. 2 illustrates a flowchart depicting various steps performed in accordance with aspects of the disclosure.

FIG. 1 illustrates an example of a suitable computing system environment 100 that may be used according to one or more illustrative embodiments of the invention. The computing system environment 100 is only one example of a suitable computing environment and is not intended to suggest any limitation as to the scope of use or functionality of the invention. The computing system environment 100 should not be interpreted as having any dependency or requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, the computing system environment 100 may include a computing device 101 having a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and non-volatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101. Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Although not shown, RAM 105 may include one or more are applications representing the application data stored in RAM memory 105 while the computing device is on and corresponding software applications (e.g., software tasks), are running on the computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As described in detail below, the database 121 may provide centralized storage of account information and account holder information for the entire business, allowing interoperability between different elements of the business residing at different physical locations.

Computing device 101 may operate in a networked environment supporting connections to one or more remote computing devices, such as branch terminals 141 and 151. The branch computing devices 141 and 151 may be personal computing devices or servers that include many or all of the elements described above relative to the computing device 101. Moreover, the devices 141 and 151 may be point of sale (POS) devices coupled to a computer server (e.g., a computer system operated by a bank or other financial institution) via a network (e.g., one or more routers or computer systems, a computer system operated by the issuer of the credit card or debit card/check card used to make a purchase, etc.) for receiving financial account information (e.g., a credit card reader, debit card reader, check scanner, online bill pay interface, etc.). The POS may be an electronic cash register that includes a barcode reader that is used to read barcodes on products and to automatically enter the products and prices into POS. POS may further include a card reader that reads account information from a credit card, debit card, or any other type of financial device that can be used to purchase an item. POS may include other devices, such as a keypad, that can also be use to read account information for facilitating a transaction. In one embodiment, POS may be located at a retailer.

The network connections depicted in FIG. 1 include a local area network (LAN) 125 and a wide area network (WAN) 129, but may also include other networks. When used in a LAN networking environment, computing device 101 is connected to the LAN 125 through a network interface or adapter in the communications module 109. When used in a WAN networking environment, the server 101 may include a modem in the communications module 109 or other means for establishing communications over the WAN 129, such as the Internet 131. It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computing device 101 according to an illustrative embodiment of the invention may include computer executable instructions for invoking user functionality related to communication, such as email, short message service (SMS), and voice input and speech recognition applications.

In accordance with aspects of the disclosure, a method is contemplated to enhance the ability to save money. In one embodiment, the method permits a debit card holder to save as he/she makes everyday purchases. For example, when the debit card holder uses the debit card to make a purchase, the transaction amount for each purchase may be increased to the next integer dollar amount if the transaction is not already an integer dollar amount. (If the transaction amount is already an integer value, under alternative embodiments in accordance with aspects of the disclosure, the transaction amount may still be increased to the next greater integer value, or alternatively, remain unchanged.) The difference between the actual amount and the increased amount is transferred from the holder's checking account to another account (e.g., a savings account); thus, creating an interest-paying virtual change jar. The aforementioned approach of increasing the transaction amount may be referenced in this disclosure as "the increasing approach." One skilled in the art will appreciate after review of the entirety disclosed herein that the disclosure contemplates other triggering events/acts. In addition, one skilled in the art will appreciate after review of the entirety disclosed herein that the disclosure contemplates other techniques for determining a savings amount to transfer.

Continuing with the above example, the account holder can receive additional bonus or match money to encourage use of the savings program. For example, the bonus or match money may be in the form of interest that would be in addition to the interest the holder would normally earn in an interest-bearing account. For example, at the end of the year, the holder's financial institution may match the transferred savings at 100% for the first 3 months and 5% thereafter. The holder may continue to receive this 5% match reward of the transferred savings each year around the anniversary date. This bonus or match money may be capped, for example, up to a predetermined amount of money (e.g., $250). One skilled in the art will appreciate after review of the entirety disclosed herein that the disclosure contemplates other techniques for matching or providing a bonus. For example, one of numerous variations contemplated by the disclosure includes providing different percentage/amount of interest yield during a particular time period.

Disclosed herein are various techniques that may be implemented in an automated savings program as well as various aspects of such an automated savings program. First, the process for customer eligibility for matching and enrollment is disclosed. Second, various aspects of savings are disclosed (e.g., calculating the amount, when the amount is transferred, saving for other purposes, credit card transactions, etc.). Third potentially exceeding the account balance, techniques are disclosed to protect against Finally, various techniques as disclosed for providing a match or bonus. Those skilled in the art will appreciate that any combination of these techniques and aspects may be implemented.

Customer Eligibility & Enrollment

A financial institution may offer the aforementioned financial product/method to new account holders or prospective account holders. In one aspect of the eligibility/enrollment process, based upon customer segmentation (e.g., customer account status-regular, premium, platinum, gold, etc.; debt card usage-low, moderate, high; etc.), the financial institution may offer varying aspects and/or levels (e.g., higher matching levels, minimum balance requirements, etc.) of financial product/methods to account holders. In another aspect of the eligibility/enrollment process, an account holder may be able to discontinue (i.e., dis-enroll) from the savings program through online and/or other (e.g., telephone, in-person, etc.) methods. Moreover, the account holder may dis-enroll temporarily, for example, to avoid exceeding the account balance. In some instances, a financial institution may configure the automated savings amount transfers such that if the source account balance is below a predefined threshold (e.g., $10) amount, then the automatic savings amount transfers are temporarily deactivated. As such, during the temporary deactivation, the account holder would not enjoy the benefit of automated savings and matching/bonus. Additional features related to exceeding the account balance are also discussed later in this disclosure. In one example, the temporary deactivation feature may be configurable by the account holder through an online interface (e.g., the financial institution's website).

Automatic Savings

In one embodiment, the savings amount may be transferred from a first source account (e.g., any type of account as long as it is a source of funds) to a recipient account (e.g., a money market account, a savings account, etc.). In an alternative embodiment, the savings amount may be transferred from a first source account to multiple recipient accounts. Although such an alternative embodiment provides additional flexibility of the savings program for the user, it may present technical complexity for the financial institution.

In yet another embodiment, the savings amount may be applied against outstanding debt. For example, the savings amount may be used to pay down debt (e.g., mortgage, student loans, credit cards, etc.) as another use of the money saved. Any matching (or bonus) amount may also be applied against outstanding debt. In another embodiment, the recipient account may be a retirement account (e.g., an IRA account, Roth IRA account, etc.).

In accordance with various aspects of the disclosure, the savings amount automatically transferred from an account holder's source account to a recipient account may be calculated (in step 206) based on one or more factors. For example, under an increasing approach a transaction amount may be increased to the next highest integer value. Meanwhile, under another approach, the transferred savings amount may be calculated by decreasing the transaction amount to the previous lowest integer value if the transaction is not already an integer dollar amount. (If the transaction amount is already an integer value, under alternative embodiments in accordance with aspects of the disclosure, the transaction amount may still be decreased to the previous lowest integer value, or alternatively, remain unchanged.) The aforementioned approach of decreasing the transaction amount may be referenced in this disclosure as "the decreasing approach."

As further explained below, the decreasing approach may be useful in the case of a savings program based on credit card transactions. In another example, the savings amount may be a fixed amount (e.g., $1, $0.50, $5, etc.) per transaction. In yet another example, the total savings amount for a period of time (e.g., a year) may be limited to a predefined maximum amount.

In an alternative embodiment, an account holder may customize (e.g., through an online graphical user interface) the specifics of its automated savings program. For example, the customer may configure, at account enrollment and thereafter, one or more various features of the automated savings account discussed herein including, but not limited to, the following: the source account(s), the recipient account(s), the savings scheme (round-up, percentage amount, predetermined dollar amount, etc.), the aggressiveness of the savings scheme (e.g., in the case of an increasing approach, the amount of transferred savings), charitable savings, payment of exiting loans, or savings for a specified purchase item. For example, a customer may designate the increasing approach to use the next highest $5 denomination. As such, the amount of transferred savings amount is greater. Likewise, the aggressiveness of the transferred savings amount may be controlled for other types of savings amounts disclosed herein and contemplated by one of skill in the art after review of the entirety disclosed herein. Although such an embodiment provides customization of the savings program for the user account, it may present technical complexity for the financial institution. Such a computer system may require that information about user preferences/settings are used by an incentive engine and/or provided to a parameter-based rules engine (e.g., an incentive engine that accepts different parameters to customize the matching/savings aspects for a user in accordance with various aspects of the disclosure.).

Each of the above-referenced customizable features may be implemented as a parameter for the customer's accounts. In one example, once the customer's account has configured for his/her customized automated savings program, values for the various parameters may be passed to the deposit applications. This information may be passed to deposit applications, in one example, as part of eligibility information. The deposit applications may thereby implement the customer's customized savings program in accordance with the parameter values provided. The deposit applications may determine the transferred savings amount based on the parameter designated for the increasing approach ($5 denominations, $10 denominations, etc.). These transferred savings amounts may be aggregated together for each account, and one debit may be charged to the checking account. If sufficient funds were available, the transaction may post to the checking account (in step 206) and a request for transfer to the recipient account is sent to a credit engine. The credit engine verifies the existence and status of the receiving account and creates a credit transaction for the transferred savings amount to post in the next processing cycle. It will be appreciated that the amount of customization that is afforded to the customer is proportional to the complexity of the system for the financial institution.

In accordance with aspects of the disclosure, the transfer of the savings amount from a source account to a recipient account may occur at various times and/or time intervals. For example, as described in one embodiment in U.S. application Ser. No. 11/161,418 filed Aug. 2, 2005, which was previously incorporated by reference herein, the savings amounts for all transaction in a day may be aggregated and a single transfer may be performed daily. One skilled in the art will appreciate after review of the entirety disclosed herein that the transfer operation may occur at various times (e.g., weekly, monthly, bi-weekly, bi-daily, annually, etc.) For example, the savings amount may be transferred in near realtime (i.e., a separate transaction for transferring the savings amount for each transaction may be processed once the triggering transaction has been received at computer system 101.) As such, an account holder may find numerous transfers of savings amounts occurring throughout a day instead of a single aggregated transfer.

For example, as eligible transactions are received at the financial institution, they may be posted to the deposit account in a near real-time process. Various techniques may be used to calculate the transferred savings amount using the increasing approach. In one such technique, each transaction received by the deposit account may have its transferred savings amount under the increasing approach calculated and posted at the time of the transaction. The aforementioned transaction may be sent immediately to a credit engine. The credit engine may create a transaction which may be sent immediately to a receiving account. Under another technique, each transaction received by the deposit account would have the transferred savings amount using an increasing approach calculated and stored in a bucket. During the end of day reconcilement, the stored value may be compared to the ending balance, and if the balance remains positive, a transaction may be posted to the deposit account. This amount will be sent to a credit engine to perform the same process as in the aforementioned technique.

In accordance with aspects of the disclosure, the savings amount may be obtained automatically from one or more source accounts. For example, an account holder may designate a checking account at a financial institution as the source account. In another embodiment, the account holder may designate more than one source account, for example, an alternate source account in the event that an account contains inadequate funds. Alternatively, the savings amount may be sourced from multiple accounts and the percentage to be taken from each account may be designated (e.g., 25% from checking account A and 75% from checking account B). Although such an embodiment provides additional flexibility of the savings program for the user, it may present technical complexity for the financial institution.

In accordance with various embodiments of the disclosure, the savings amount may be transferred to a recipient account. The recipient account (e.g., savings account) may be a high interest yield account designated for such a savings program. In some embodiments, the recipient account may be configured such that the account holder may not be able to withdraw the transferred savings amount from the recipient account before a predefined period of time (e.g., one year) without incurring additional charges. As such, the savings account encourages the account holder to save money and earn a higher interest yield.

In an alternative embodiment, the savings amount may be transferred from a first source account to multiple recipient accounts (e.g., a money market account, a savings account, retirement account, etc.) In yet another alternative embodiment, the multiple recipient accounts may be owned by different people. Although such an embodiment provides additional flexibility of the savings program for the user, it may present technical complexity for the financial institution. U.S. application Ser. No. 11/161,418 filed Aug. 2, 2005, which was previously incorporated by reference herein, lists numerous examples of recipient account configurations.

In another embodiment, the savings amount may be applied against outstanding debt. For example, the savings amount may be used to pay down debt as another use of the money saved. Any matching (or bonus) amount may also be configured to be applied against outstanding debt. For example, instead of creating a deposit to the savings account, a credit generating system in communication with computer system 101 may create a payment to, for example, an associated credit card, a personal or business loan, a home mortgage or home equity loan, a car loan, a student loan, etc. Moreover, business rules may be formulated and used to determine whether the payment is applied to interest or principle. In an embodiment where the savings amount is applied to a non-credit card debt, a similar technical implementation may be taken. For example, computer system 101 may submit a payment on behalf of the account holder to reduce the outstanding debt. Similar to the technical steps to create a transaction to pay down credit card debt as explained herein, the automated payment of a student loan debt, car loan debt, and other debt vehicles perform accordingly. Rather, the transaction for each type of debt vehicle may require formatting according to the receiving system.

In yet another embodiment, the recipient account may be a retirement account (e.g., an IRA account, Roth IRA account, 401(k) account, etc.) Alternatively, the recipient account may be a gift card account where the account holder's savings are applied to a gift that he/she may use themselves or give to another as a gift. Alternatively, the recipient account may be a health savings account.

Figure 3:
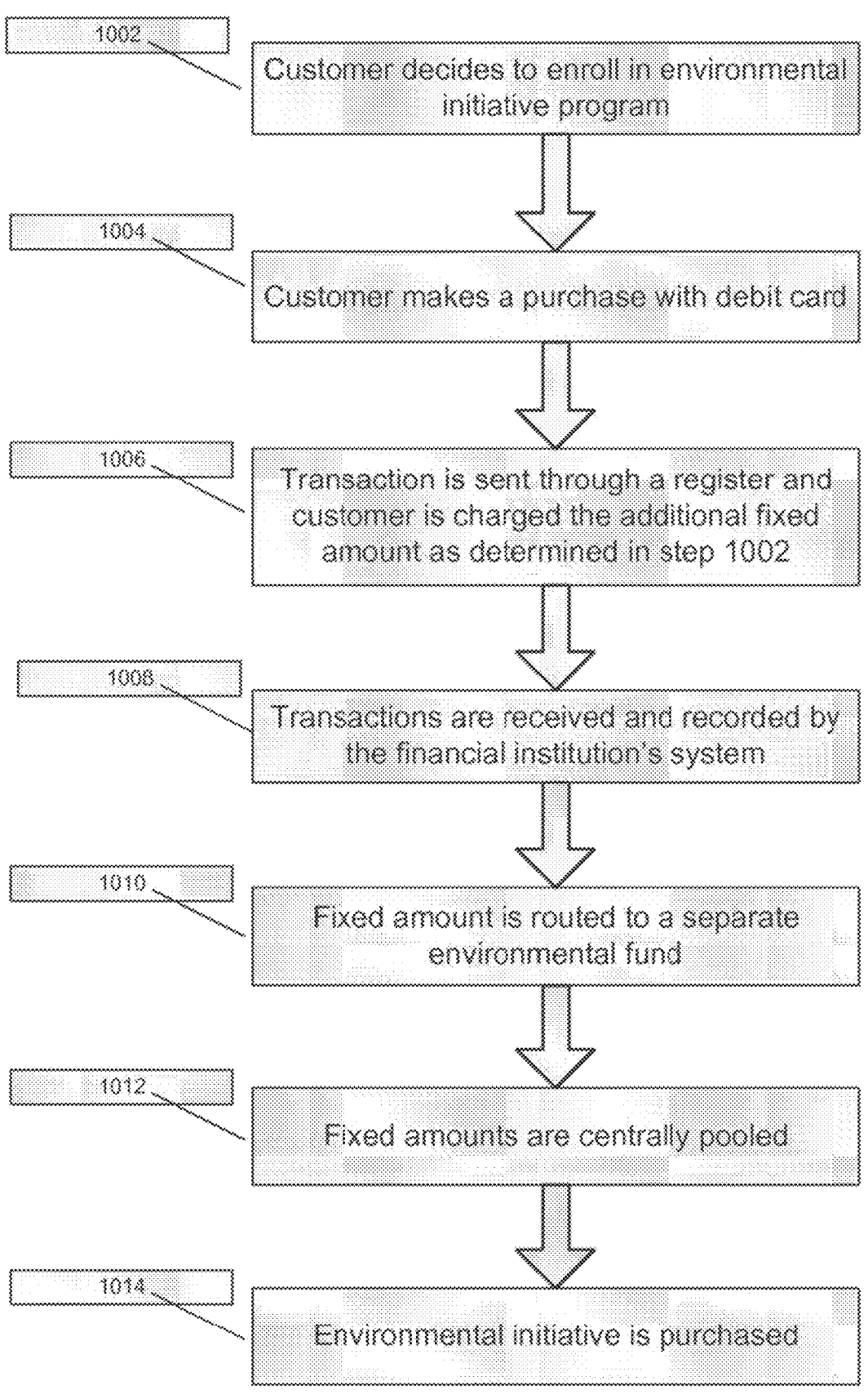
FIG. 3 illustrates a flowchart depicting a method in accordance with aspects of the disclosure.

In yet another example, an automated savings program may allow an account holder to participate in a charitable program. In the example provided with reference to FIG. 3, the charitable program is an environmental initiative program 1002. By enrolling and participate in this environmental program, a financial institution adds a predetermined amount (e.g., $0.01) to the account holder's total purchase amount for each transaction (e.g., each time they use their debit card). One skilled in the art will appreciate that the financial institution has the option of offering differing amounts (e.g., amount higher (or lower) than 1¢ per transaction) to its account holder; thereby creating more (or less) purchasing power to the environmental program. Although such an embodiment provides additional flexibility of the savings program for the user, it may present technical complexity for the financial institution.

Next, the account holder may make a purchase using the debit card 1004. This transaction is sent through a point of sale (POS) device, such as those described in U.S. application Ser. No. 11/161,418 filed Aug. 2, 2005, which was previously incorporated by reference herein, and the account holder may be charged the additional predetermined amount 1006. One skilled in the art will appreciate that this fixed amount could be withdrawn from not only debit card transactions, but also credit card transactions, or other purchases completed by an equivalent account and/or card. When the predetermined amount is withdrawn from the customer and transferred to the environment program, the transfer transaction is received and recorded by a computer system at the financial institution 1008. In one example in accordance with aspects of the disclosure, the predetermined amount may be routed to a separate, second environment fund 1010. The predetermined amounts from each of the customers enrolled in the program may be pooled together 1012. Following this, the pooled funds can be paid to the environmental program 1014.

Another example, similar to the one described above, begins with an account holder selecting to contribute to an environmental program which purchases carbon offsets. This type of environmental program may give the account holder a simple way to partially neutralize their carbon impact and be part of a larger collective initiative. The account holder may configure their participation in the program to add one cent (1¢) to each of his/her debit card transactions. The account holder may then make a purchase of $1.50 using their debit card. The account holder may be charged an additional 1¢ for a total of $1.51. The 1¢ may be routed to a separate account which will be used to purchase carbon offsets and may be centrally pooled together with other account holders participating in the environmental program. Finally, with these pooled funds, carbon offsets may then be purchased. With a program such as this, the account holders of a financial institution may be collectively responsible for: negating the impact of 150,000 SUVs on the road for a year, or protecting the equivalent of 4,800 football fields of tropical rainforest from deforestation, or negating the impact of 1,000 residents of each of the 50 states for a year.

In addition to the use of a debit card as disclosed in U.S. application Ser. No. 11/161,418 filed Aug. 2, 2005, which was previously incorporated by reference, other events/acts may results in an automatic transfer occurring. For example, the use of a credit card in making a purchase may act as a trigger to cause the transfer of a savings amount for the credit card holder. When the holder makes a purchase using a credit card associated with a financial institution, the purchase transaction amount is decreased using a decreasing approach, actually reducing the amount the holder is charged. In some embodiments, the transaction amount may be reduced by less than the aforementioned amount. In one example, the savings amount may be a fixed amount or a percentage of the savings amount.

In addition, the financial institution may transfer the difference between the amount of the transaction under a decreasing approach and the actual transaction amount from the holder's checking account to a second account. For example, Customer #1 uses a credit card to make a purchase for $10.25. The transaction amount charged to Customer #1 for the purchase is decreased to $10. Moreover, the financial institution covers the outstanding $0.25 on Customer #1's behalf as a bonus/matching amount. Furthermore, the bank transfers $0.25 (i.e., the bonus/matching amount) from Customer #1 checking account at the financial institution to her savings account. As such, the financial institution facilitates a savings program for the account holder. In some embodiment, at the end of the year (or any other period of time), the financial institution may yet again reward the card holder by matching a percentage (e.g., 100%, 50%, etc.) of his/her transferred savings amounts. Alternatively, the card holder may be rewarded in many of the other ways as described throughout this disclosure. The card holder may choose to have this matched/bonus amount applied against any credit card balance, or may be deposited into any of the holder's accounts (e.g., checking, savings, etc.) While aspects of the aforementioned aspects of the disclosure are similar to hackneyed cashback-type rewards programs offered by some major credit card companies, one skilled in the art will appreciate after review of the entirety disclosed herein that one or more aspects are novel and non-obvious over such prior art programs.

In another embodiment in accordance with aspects of the invention, when an account holder makes a purchase using a credit card associated with a financial institution, the difference between the transaction amount and the increased amount under an increasing approach is transferred from the holder's checking account to another account (e.g., a savings account). For example, Customer #2 uses a credit card to make a purchase for $10.25. The transaction amount for the purchase remains $10.25. Meanwhile, the financial institution deposits $0.75 to a savings account under Customer #2's name as a bonus amount. As such, the financial institution facilitates a savings program for the account holder.

Furthermore, as described in U.S. application Ser. No. 11/161,418 filed Aug. 2, 2005, which was previously incorporated by reference, a method contemplated to enhance a person's ability to save money may include a feature to protect and/or avoid exceeding the account balance. Such a feature designed to avoid exceeding the account balance may include, in some embodiments, a retroactive feature. In one example such a feature enables a financial institution to postpone the transfer of a savings amount if the transfer would result in the holder's source account exceeding its account balance. The financial institution may retry the postponed transfer at a later time (e.g., after six hours has elapsed, after twelve hours has elapsed, etc.) and/or at regular intervals (e.g., daily, bi-daily, hourly, weekly, etc.). For example, the financial institution may predefine the maximum number of retries (e.g., five retries) and the interval between each retry (e.g., wait one day between each retry) to prevent a scenario where postponed transfers are accrued and retried indefinitely. In yet another example, a portion of the savings amount may be applied without causing a negative account balance, while the remaining portion is postponed (or cancelled) as described in the aforementioned retroactive feature.

Alternatively, a feature designed to avoid exceeding the account balance, in accordance with aspects of the disclosure, may include an option to designate a second source account to be used if a transfer of the savings amount from the first source account would cause it to exceed the account balance. The second source account may be of any type recognized by one of skill in the art as a viable source of funds. Examples of such sources of funds are disclosed or suggested throughout this disclosure.

In yet another embodiment in accordance with aspects of the disclosure, a feature designed to avoid exceeding the account balance. may include a grace period during which an account holder may remedy the situation of exceeding the account balance. to avoid charges associated with exceeding the account balance. For example, an account holder may deposit funds in an account before the close of the business day to eliminate any occurrences of exceeding the account balance that may have been caused earlier in the day due to transactions. In such a situation, the account holder may not be charged for exceeding the account balance (or may be charged only a reduced amount or percentage of the normal fee for exceeding the account balance).

In accordance with aspects of the disclosure, a computer system, may be used as a base to implement one or more aspect of the feature designed to avoid exceeding the account balance Accounts that have a negative account balance may have the daily (or other time interval) transaction corresponding to the transfer savings amount added to a retry file with a counter for the number of days (or other time interval) the transaction can be reapplied. The computer system 101 may allow the financial institution to save these files and check the accounts for available funds for a period of time. The transactions from the retry file may be included with the next processing day's posting items. If the account has a negative account balance, the retry counter may be decremented by one and the transaction may be re-added to the retry file. If the account does not have a negative account balance, the aforementioned transactions may be passed forward for processing to create the savings credit. The system 101 may input the savings credit into a deposit system for a processing cycle.

Matching/Bonus Aspects

In one example, the matching (i.e., bonus) paid to the account holder (in step 214) may be based on one or more factors. For example, as described in one embodiment in U.S. application Ser. No. 11/161,418 filed Aug. 2, 2005, which was previously incorporated by reference herein, the financial institution (in step 218) may offer to match the transferred savings amount under the increasing approach (or savings amount under other approaches) by providing $0.05 for every transaction. In another example, the financial institution (in step 218) may offer $1.00 (or any other predefined amount) for every transaction (e.g., debit card purchase, credit card purchase, etc.). The matching may be provided for only a predetermined period of time, for example, during the first six months of enrolling in the program/product. Furthermore, the matching may be a based on a percentage of the transferred savings amount (e.g., 100%-dollar for dollar, 50%-50 cents to the dollar, etc.) Computer system 101 may verify that an account holder is eligible (in steps 208, 210, and/or 212) for matching/bonus before crediting the match amount to the account holder's recipient account.

In yet another embodiment in accordance with aspects of the disclosure, the matching/bonus amount may be a predetermined amount at a regular interval. For example, a $100 may be automatically transferred from an account holder's checking account to his/her savings account. The $100 transferred savings amount may be entitled to the same (or more or less, as would be apparent to one skilled in the art after review of the entirety disclosed herein) of a match/bonus as other savings amounts transferred into the account. For example, under a segmented approach, transferred savings amounts from debit card (or credit card) use may be entitled to full matching, while transferred savings amount from an automatic monthly transfer may be entitled to half matching. In addition, the period of time during which the account holder may qualify for matching on the different types of transferred savings amounts may also vary (e.g., the automatic monthly transfers are eligible for matching for only three months, while the other type may be eligible for six months). In another embodiment, the matching may require that the total balance on the account is growing month after month. In yet another embodiment, the account holder may be required to maintain a minimum balance in his/her account (e.g., checking and/or savings) to be eligible for matching/bonus.

In yet another embodiment, the total amount of matching/bonus for a given period of time (e.g., one year) may be limited to a predefined maximum value. Alternatively, the number of transactions eligible for matching during a given time period (e.g., a day) may be limited to a predefined maximum number.

In another example, the match/bonus may be based (in step 208) on a balance tier system (i.e., the amount of balance in a holder's account may categorize them into different tiers with varying matching/bonus levels). An incentive engine executing in a computer system 101 (e.g., using processor 103) may receive the appropriate balance total from a deposit system. The received balance total may be a pre-calculated value that the computer system 101 may use without further intensive processing. Alternatively, the received balance total may be calculated at computer system 101 in numerous ways in accordance with aspects of the disclosure: a multi-month moving average, monthly average, current balance, average daily balance over the prior 12 months, average daily balance over the last 30 days, balance at the time the matching/bonus amount is calculated (i.e., the balance in the account on the date when the, e.g., debit card purchase occurred), minimum balance during the prior 30 days, average over the last 90 days, etc. The incentive engine may comprise of computer-executable instructions used to determine the match level based on this calculated balance. The incentive engine may access (e.g., in memory 115) a table with information about match level and the balance total corresponding to that match level. At least one technical benefit of such a system is that it allows the tiers or match levels to be changed with greater flexibility.

For example, an account holder with a balance less than $1,000 may receive a 2% match on the transferred savings amount. Meanwhile, an account holder with a balance of at least $1,000, but not more than $10,000 may receive a higher match (e.g., 5%) on the savings amount. Moreover, a holder with a balance of $10,000 or more may receive an even higher percentage match. One skilled in the art after review of the entirety disclosed herein will appreciate that the matching may be other than a percentage amount. For example, the balance tier may include an approach where as the balance increases, the matching is a predetermined amount per transaction that also increases with each balance tier.

In another example, the match (or bonus) may comprise of rewards based on certain customer purchase behavior (e.g., double the match for gas purchases). Yet another way to reward customers may be based on the number of transactions or purchase volume over certain period of time. For example, an institution may provide a higher matching level to an account holder that achieves more than a threshold number of card transaction (e.g., credit, debit, etc.), or spend greater than a particular amount per month on a card (e.g., credit, debit, etc.)

The aforementioned features in accordance with aspects of the disclosure may be implemented in a computer system 101. When computer system 101 receives POS transaction information, the transactions may have a code associated with it that links the transaction to a merchant type. Such a code may be used to determine the matching (i.e., incentive package) for the transaction. For example, an account holder may receive higher matching/bonus for purchases at a particular merchant (in step 208 and 210), or for particular types of purchases (e.g., bookstore purchases to encourage education, healthcare purchases/costs to encourage good health) (in step 212). In some instances, a financial institution may waive a maintenance fee (e.g., monthly fee) (in step 214) based on the number of transactions (e.g., debit card or credit card) or based on the number of dollars spent on purchases. An incentive engine executing in computer system 101 may track the number of transactions on an account (e.g., debit card account) and/or the amount of dollars spent from each account. If an account exceeds a threshold value (in step 208), an additional bonus/matching (or reward) may be assessed for the account. The incentive engine may be comprised of computer-executable instructions executed by a processor 103 in computer system 101.

In another embodiment, a merchant matching feature may be included in accordance with aspects of the disclosure. For example, a list of merchants may be provided to an account holder that will cause the account holder to achieve increase matching/bonus levels for his/her savings amount. In one example, the merchants may provide (in step 216) a portion or all of the matching/bonus funds transferred to the account holder's account for purchases associated with the merchant. As such, the account holder may be motivated to shop with the merchant. One of ordinary skill in the art after review of the entirety disclosed herein will appreciate that various features and aspects of the disclosure may be combined with the aforementioned merchant matching feature and such combinations are contemplated by the disclosure. For example the merchant matching feature may be combined with a tiered approach disclosed herein to provide higher levels of matching/bonus for those account holders with increased number of transactions with a merchant or increase amount of total transaction amount with a merchant.

In yet another example, the matching/bonus may depend on the number of products an account holder has with a financial institution. A computer system 101 may include or communicate with the financial institution's customer information system. The customer information system may provide information about the overall customer relationship (e.g., the number and type of accounts a person has with the institution, how long the person has been an account holder, etc.) and the computer system 101 may determine matching level accordingly. For example, a table in memory 115 at the computer system 101 may link different matching/bonus levels to different levels of customer loyalty. A long-time customer with a large number of accounts (e.g., auto loan, home loan, home equity loan, investments, deposits, etc.) with substantial balances may be designated at the highest customer loyalty level, thus receive a high bonus/matching (e.g., 100% matching).

In yet another example, an account holder may choose to receive the match as reward points that can be redeemed for merchandise, gift cards, airline miles, etc. For example, the account holder may identify an item they wish to purchase. Once sufficient matching amounts have accumulated for the account holder, a financial institution may contact a merchant selling the product, and procure the product for shipment to the account holder. The account holder may be notified for his/her final approval before the institution makes the final purchase and shipment. Alternatively, the financial institution may procure the product when the sum of the account holder's savings amount (from automatic transfers through a savings program) and match amount is sufficient to purchase the item.

Finally, in another example, the matching/bonus may be based on online bill pay transactions. As such, an account holder may be provided an incentive to use electronic (i.e., online) bill pay. For example, an account holder that registers for electronic statement in lieu of paper statements may be afforded a higher matching/bonus level than a holder that does not. Likewise, an account holder that registers for direct deposit may be allocated a higher matching/bonus level than a holder that does not. Moreover, a financial institution may encourage it's account holders to use direct deposit by increasing (e.g., using the increasing approach) their paycheck amount and other amounts directly deposited with the institution. One skilled in the art will appreciate that other online/electronic services may be afforded a greater incentive among customers and prospective customers when linked to a higher matching/bonus level.

In another example, the matching (i.e., bonus) paid to the account holder may be based on the account holder growing his/her account balance over a period of time (e.g., subsequent number of months). For example, an account holder may be paid a particular matching/bonus level for the first 3 months, but if the holder increases the balance of his/her savings account for the subsequent six month following the first 3 months, a financial institution may retroactively apply a bonus (e.g., 2% interest, etc.) to the first 3 months balance. One skilled in the art will appreciate after review of the entirety disclosed herein that there are numerous techniques disclosed for calculating balance for a period of time and may be applied to the aforementioned embodiment. In another example, the account holder may be required to maintain a minimum balance (e.g., $300) and/or enroll in an automatic scheduled transfer (e.g., a monthly automated transfer of $25 from a checking to the savings account) to be eligible for the aforementioned retroactively applied bonus feature. Furthermore, in yet another embodiment, if the savings account balance is the same or higher at the one-year anniversary date of enrolling in the savings program, a financial institution may at least double the matching/bonus amount to help grow the savings amount even more.

In yet another embodiment, the match/bonus paid to an account holder may be based on his/her use of online bill pay features. For example, online bill pay transaction codes may be designated in computer system 101 (e.g., by adding the codes to a list of transaction codes identified as eligible for automatic savings and/or matching) to trigger the transfer of automatic savings amounts. Therefore, when such transactions appear on an account holder's statement, the financial institution may determine that an online transaction (e.g., online bill pay transaction or other similar type of online transaction) has occurred, and provide a matching/bonus contribution.

In addition, to encourage additional savings, a financial institution may offer an account holder the option to increase (e.g., double) his/her matching/bonus level if he/she enrolls for an automatic scheduled transfer of at least a predetermined amount (e.g., $25/month) to a saving account. The matching/bonus level may be phased out such that the holder receives full matching for a period of time (e.g., the first 3 months), and then a fraction of that amount (e.g., 10%) ongoing thereafter. In another embodiment, the account holder may be required to maintain a minimum deposit amount (e.g., $300) in his/her savings account in addition to the aforementioned in order to be eligible for the increased matching/bonus level. In another example, if the account holder does not make any withdrawals from the savings account for a period of time (e.g., one year), a financial institution may provide a higher matching level (e.g., double the match from the prior year, increase the matching level for the subsequent year, etc.) In another example, when an account holder deposits large or certain types of funds (e.g., tax refund) into a savings account and does not withdraw the funds for a predefined period of time (e.g., one year), the institution may provide an increased matching/bonus level (e.g., double matching, increased interest rate yield) on the savings amount.

In another example in accordance with aspects of the invention, a financial institution may enforce a predefined maximum limit (e.g., $300) for the matching/bonus amount for a given period of time (e.g., one year). Meanwhile, the institution may match the transferred savings amount at 100% for an initial period of time (e.g., 3 months) and a lower matching level (e.g., 5%) thereafter.

Furthermore, to encourage savings, an account holder and financial institution may identify a period of time (e.g., one year) and a savings amount goal for the holder's savings amount. If the holder achieves the goal, the financial institution may reward the account holder by providing an increased matching level (e.g., double the match from the prior year, increase the matching level for the subsequent year, etc.)

In yet another example, when an account holder regularly pays (e.g., for one consecutive year) at least the minimum amount due on his/her credit card, a financial institution may increase the level of matching/bonus paid on transferred savings amount. As such, the financial institution encourages good financial management among its account holders. Furthermore, to encourage account holders to maintain a credit card and checking account (or debit card) with the financial institution, the institution may offer an increased matching/bonus level to an account holder commensurate with the amount of interest paid on the holder's credit card. In another embodiment, the financial institution may refund a portion (e.g., 1%, 5%, 20%) of the total amount of interest paid on the holder's credit card over a period of time (e.g., one year) for one or more reasons, including, for example, if the account holder regularly pays at least the minimum amount due on his/her credit card over the time period.

As explained throughout the disclosure herein, the matching amount may be deposited in a recipient account with a financial institution. Some examples of recipient accounts include savings accounts that have restrictions on the account holder's ability to withdraw funds without early withdrawal charges. In addition, the matching amount may be deposited in various different types of recipient accounts (e.g., gift card account, etc.) Furthermore, in some embodiments, the matching amount may be reward points applied towards airline frequent flier mile programs, or other reward-like programs.

In accordance with various aspects of the disclosure, the matching amount may be paid out at one or more times or regular intervals. For example, a financial institution may pay a bonus at the one-year anniversary of enrolling in the savings program on the balance on the one-year date. As such, an account holder that withdraws money prior to the one-year date may not achieve maximum matching/bonus. In another example, the matching amount may be paid at the end of each day. In yet another example, a matching amount may be paid in "near realtime" as transactions eligible for matching are received at computer system 101. In yet another example, matching amounts are paid out only after an aggregate match amount threshold (e.g., $10) has been reached. As such, a financial institution can reduce the number of transfers that are required to implement a savings program in accordance with aspects of the disclosure.

Another embodiment of the disclosure includes forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the disclosure is contemplated. For example, aspects of the method steps disclosed herein may be executed on a processor on a computing device 101. Such a processor may execute computer-executable instructions stored on a computer-readable medium.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Also, one of ordinary skill in the art after review of the entirety disclosed herein will appreciate that various features and aspects of the disclosure may be combined with other features and aspects disclosed herein. For example, various aspects of the numerous examples provided with regards to debit card use may be applied to embodiments regarding credit card use. Likewise the different matching/bonus features listed herein may be combined or substituted for other matching/bonus features to fully appreciate the embodiments contemplated by the entirety of the disclosure.

We claim:

1. A system for providing rewards amounts comprising:
   a point-of-sale device comprising a barcode reader configured to read barcodes on products of a merchant;
   a computer system of a financial institution comprising a processor for executing computer-executable instructions stored in a memory, wherein the computer system is configured to manage an account, associated with a customer, and configured to execute debit transactions, and an outstanding debt associated with the customer;
   a communication interface adapted to receive financial transaction information over a communication network, wherein the financial transaction information is associated with the barcodes on the products of the merchant; and
   the computer-executable instructions for performing steps comprising:

(a) receiving, through the communication interface, information relating to a first base financial transaction associated with the account;

(b) receiving, through the communication interface, information relating to a second base financial transaction associated with the account;

(c) periodically calculating, using the processor, an aggregate savings amount based at least on the first and the second base financial transactions;

(d) determining that the account has sufficient funds to cover the aggregate savings amount;

(e) responsive to determining that sufficient funds are available to cover the aggregate savings amount, debiting the aggregate savings amount from the account and crediting, using a credit generating system in communication with the computer system, the aggregate savings amount against the outstanding debt;

(f) calculating a number of the first base financial transaction and the second base financial transaction for products between the customer and a designated merchant;

(g) periodically calculating a rewards amount based on the calculated number from step (f);

(h) updating the rewards amount by increasing the rewards amount when the number of the first and the second base financial transactions between the customer and the designated merchant exceeds a predetermined value; and (i) crediting the updated rewards amount in the account, wherein a computational load on the point-of-sale device is reduced because the calculating of the rewards amount is distributed to the computer system.

2. The system of claim 1, wherein the rewards amount is provided by the financial institution.

3. The system of claim 1, further comprising:

(j) waiving a fee associated with the account based on a dollar amount of financial transactions by the customer in a fixed period of time.

4. The system of claim 1, further including an incentive engine storing computer-executable instructions configured to monitor a dollar amount of financial transactions by the customer and to increase the rewards amount if the dollar amount of financial transactions exceeds a predetermined value in a fixed period of time.

5. The system of claim 1, wherein the credit generating system comprises an electronic processor configured to execute additional computer-executable instructions stored in one or more memories, and the one or more memories is configured to store business rules, where the business rules indicate that the crediting the aggregate savings amount is applied to principal of the outstanding debt.

6. The system of claim 1, where the credit generating system comprises one or more memories configured to store business rules that indicate that the crediting the aggregate savings amount is first applied to interest of the outstanding debt.

7. A system for distributing computational load on a point-of-sale device that is involved with providing rewards amounts comprising:

the point-of-sale device comprising a barcode reader configured to read barcodes on products of at least a designated merchant;

a first account associated with a customer and configured to execute debit transactions;

a second account associated with the customer;

a financial account associated with the designated merchant;

a communication interface adapted to receive financial transaction information over a communication network, wherein the financial transaction information is associated with the barcodes on the products of the at least the designated merchant;

computer-executable instructions for performing steps comprising:

(a) receiving, at a financial institution, information relating to a first base financial transaction associated with the first account and relating to a transaction for at least one of goods and services between the customer and the designated merchant;

(b) receiving, at the financial institution, information relating to a second base financial transaction associated with the first account;

(c) periodically calculating, at the financial institution an aggregate savings amount based at least on the first and the second base financial transactions;

(d) determining that the first account has sufficient funds to cover the aggregate savings amount;

(e) responsive to determining that sufficient funds are available to cover the aggregate savings amount, debiting the aggregate savings amount from the first account and crediting the aggregate savings amount in the second account;

(f) calculating a number of financial transactions between the customer and the designated merchant;

(g) periodically calculating a rewards amount based on the number of financial transactions between the customer and the designated merchant;

(h) updating the rewards amount by increasing the rewards amount when the number of financial transactions between the customer and the designated merchant exceeds a predetermined value; and (i) crediting the rewards amount in the second account, wherein at least a portion of the rewards amount is debited from the financial account of the designated merchant;

a processor for executing the computer-executable instructions; and a memory for storing at least the computer-executable instructions, wherein the computational load on the point-of-sale device is reduced because the calculation of the rewards amount is distributed to the processor.

8. The system of claim 7, wherein a remaining portion of the rewards amount is provided by the financial institution.

9. The system of claim 7, wherein the rewards amount comprises a predetermined amount for each of the number of financial transactions between the customer and the designated merchant.

10. The system of claim 7, wherein the designated merchant is one of a predetermined plurality of merchants that credit rewards amounts to the second account of the customer.

11. The system of claim 7, further comprising:

(j) waiving a fee associated with at least one of the first account and the second account based on the number of financial transactions between the customer and the designated merchant in a fixed period of time.

12. The system of claim 7, further including an incentive engine storing computer-executable instructions configured to modify the rewards amount.

13. The system of claim 12, wherein the incentive engine is further configured to monitor the number of financial transactions between the customer and the designated merchant and to increase the rewards amount if the number of financial transactions exceeds a predetermined value in a fixed period of time.

14. The system of claim 7, further including a credit generating system storing business rules for crediting the aggregate savings amount.

*   *   *   *   *